United States Patent
Shin et al.

(10) Patent No.: US 6,907,418 B2
(45) Date of Patent: Jun. 14, 2005

(54) ADVERTISEMENT SERVICING SYSTEM USING E-MAIL ARRIVAL NOTIFYING PROGRAM AND METHOD THEREFOR

(75) Inventors: Dong Seok Shin, Seoul (KR); Young Goo Kang, Chungcheongnam-Do (KR)

(73) Assignees: Metabiz Co., Ltd., Seoul (KR); Hoseo University, Chungcheongnam-do (KR)

( * ) Notice: Subject to any disclaimer, the term of this patent is extended or adjusted under 35 U.S.C. 154(b) by 964 days.

(21) Appl. No.: 09/832,902

(22) Filed: Apr. 12, 2001

(65) Prior Publication Data

US 2002/0083140 A1 Jun. 27, 2002

(30) Foreign Application Priority Data

Dec. 21, 2000 (KR) ........................................ 2000-79854

(51) Int. Cl.[7] .......................... G06F 15/16; G06F 17/60
(52) U.S. Cl. ......................................... 706/206; 705/14
(58) Field of Search ................................ 709/201–207, 709/217–219; 705/14

(56) References Cited

U.S. PATENT DOCUMENTS

| | | | | |
|---|---|---|---|---|
| 5,140,530 A | * | 8/1992 | Guha et al. | .................... 706/13 |
| 5,933,811 A | * | 8/1999 | Angles et al. | ................. 705/14 |
| 6,601,053 B1 | * | 7/2003 | Schaffer et al. | ................ 706/26 |
| 2002/0051017 A1 | * | 5/2002 | Wishoff | ....................... 345/774 |
| 2002/0055968 A1 | * | 5/2002 | Wishoff et al. | .............. 709/203 |
| 2002/0070978 A1 | * | 6/2002 | Wishoff et al. | .............. 345/811 |
| 2002/0080184 A1 | * | 6/2002 | Wishoff | ....................... 345/800 |

OTHER PUBLICATIONS

Combinations of genetic algorithms and neural networks: a survey of the state of the art Schaffer, J.D.; Whitley, D.; Eshelman, L.J.; COGANN–92. International Workshop on, Jun. 6, 1992 pp.:1–37.*

Temporal associative memory with finite internal states Chengke Sheng; Yu–Cheng Liu;Neural Networks, 1994. IEEE World Congress on Computational Intelligence., 1994 IEEE International Conference on , vol.: 2 , Jun. 27–Jul. 2, 1994 pp.:1109–1114 vol. 2.*

Syntactic neural networks for text–phonetics translation Lucas, S.; Damper, B.; Acoustics, Speech, and Signal Processing, 1991. ICASSP–91., 1991 International Conference on , Apr. 14–17, 1991 pp.:509–512 vol. 1.*

Unsupervised clustering of symbol strings Flanagan, J.A.; Neural Networks, 2003. Proceedings of the International Joint Conference on , vol.: 4, Jul. 20–24, 2003 pp.:3250–3255.*

* cited by examiner

*Primary Examiner*—Anthony Knight
*Assistant Examiner*—Michael B. Holmes
(74) *Attorney, Agent, or Firm*—Jacobson Holman PLLC

(57) ABSTRACT

An advertisement servicing system using an e-mail arrival notifying program is provided. The system includes a communication network, a plurality of e-mail servers for rendering services of transmitting/receiving e-mail messages, a plurality of user computers for performing communication accessing with an external computer through the communication network, downloading and installing an e-mail arrival notifying program having an animation character with predetermined advertising data, automatically executing the e-mail arrival notifying program to then display the animation character with the advertising data on a screen for user's e-mail viewing when the e-mail of the corresponding user arrives, creating e-mail read data and outputting the same to the server computer, and a server computer for creating the e-mail arrival notifying program with animation characters to then construct a database thereof, downloading the e-mail arrival notifying program to the corresponding user computer, receiving the e-mail read data, analyzing the advertising data viewed by the users, and accumulating predetermined points on each user's account. Therefore, the user can conveniently use e-mail service through the Internet without necessity of periodically connecting to a particular e-mail server. Also, since points for the users' advertisement viewing are accumulated, the advertising effects can be further increased.

13 Claims, 7 Drawing Sheets

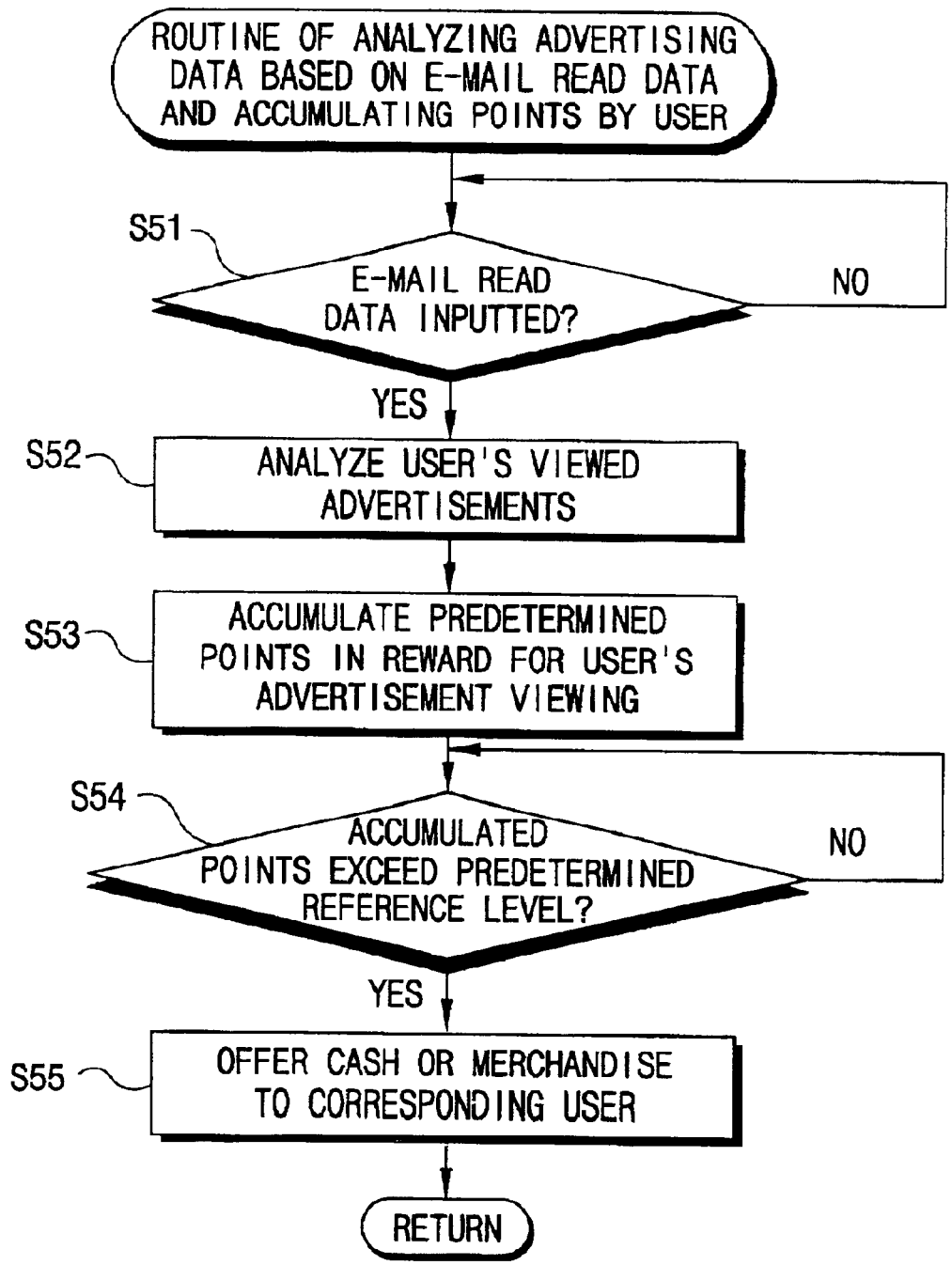

ADVERTISEMENT SERVICING SYSTEM USING E-MAIL ARRIVAL NOTIFYING PROGRAM AND METHOD THEREFOR

BACKGROUND OF THE INVENTION

1. Field of the Invention

The present invention relates to an advertisement servicing system using an electronic mail (e-mail) arrival notifying program and a method thereof. More particularly, the present invention relates to an advertisement servicing system using an e-mail arrival notifying program, in which when an e-mail is received from a particular e-mail server designated by a user, an e-mail arrival notifying program having an animation character with predetermined advertising data is automatically executed to allow the user to immediately view the corresponding e-mail, when the user views the corresponding e-mail, the server that provides the e-mail arrival notifying program, rewards the user for his/her viewing of advertisement by accumulating some points on the user's account, and simultaneously makes the user connect to the advertiser's web page for the corresponding advertising.

2. Description of the Related Art

In general, the Internet, which is an open network configured for any one to freely connect to a counterparty's computer by using a common protocol, that is, Transmission Control Protocol (TCP)/Internet Protocol (IP), anywhere around the world, allows transmission of literal data as well as transmission of multimedia data with the development of compression techniques, that is, a variety of services such as e-mail, file transfer, World Wide Web (WWW) and so on can be made available through the Internet.

As using the Internet has rapidly been on an increase all over the world, the Internet has become increasingly popular as important strategic tools for increasing efficiency and productivity of almost all industrial parts. Also, since new business opportunities over the Internet are continuously being created and business areas are also on an increase, Internet business enterprises are also gradually increasing.

In other words, according to the recently increasing tendency of Internet businesses, there has been rapidly increasing sites providing various contents such as Internet advertising, Internet broadcasting, on-line gaming, Internet newspaper/magazine, data searching service, portal service, electronic commerce and so on.

Among those sites, a great number of sites have each e-mail server that provides members with their own accounts and predetermined repository spaces so that a computer user can communicate on-line with another remote computer users through e-mail.

Also, the computer users may use e-mail service after registering as members of an Internet Service Provider (ISP), rather than to sites providing the above-described e-mail service, to then be provided with their own accounts.

As described above, although the number of sites providing e-mail services are greatly increased, the respective computer users must frequently connect to the corresponding sites to view an e-mail message directed to the his/her own e-mail account.

Thus, recently, even if the user does not connect to the corresponding site, an e-mail client program, by which e-mail arrival can be automatically notified, has been developed and used.

However, the above-described conventional e-mail client program simply provides a function of notifying that an e-mail has arrived to each user but cannot benefit by any rewards according to the use of the e-mail client program.

Since the conventional e-mail client program is generally developed by a site of providing e-mail services to then be provided only to members of the corresponding site, the users cannot selectively use their desired e-mail service.

SUMMARY OF THE INVENTION

To solve the above-described problems, it is an object of the present invention to provide an advertisement servicing system using an e-mail arrival notifying program, by which a user can immediately identify the arrival of an e-mail message such that, when the e-mail message is received from a particular e-mail server specified by a user, an e-mail arrival notifying program having an animation character with predetermined advertising data is automatically executed, and a method thereof.

It is another object of the present invention to provide an advertisement servicing system using an e-mail arrival notifying program, by which in the case that by the e-mail arrival notifying program, a user identify the arrival of an e-mail message sent from a particular e-mail server, predetermined points are accumulated on the corresponding user's account by the server that provides the e-mail arrival notifying program in reward for the user's viewing of advertisement in the e-mail message, and simultaneously the user is made to connect to the advertiser's web page for the corresponding advertising, and predetermined cash or merchandise depending on the accumulated pints is offered to the corresponding user, and a method thereof.

To accomplish the first object of the present invention, there is provided an advertisement servicing system using an electronic mail (e-mail) arrival notifying program, the system including a communication network for connecting a plurality of communication circuits to allow data communication; a plurality of e-mail servers for providing a plurality of users who have registered as members with accounts and predetermined repository spaces, and rendering services of transmitting/receiving e-mail messages to/from the plurality of users; a server computer for creating a plurality of animation characters with advertising data presented by a plurality of advertisers to then construct a database thereof and simultaneously creating an e-mail arrival notifying program having the animation characters to then construct a database thereof, receiving e-mail read data, analyzing the advertising data viewed by the users, and accumulating predetermined points on each user's account; and a plurality of user computers for downloading and installing the e-mail arrival notifying program from the server computer through the communication network, automatically executing the e-mail arrival notifying program to then display the animation character on a screen for user's e-mail viewing when the e-mail of the corresponding user is received by an e-mail server designated by the user among the plurality of e-mail servers, creating the e-mail read data and outputting the same to the server computer when the corresponding user views the e-mail addressed to himself/ herself by the animation character, and when the user's e-mail viewing is completed, automatically executing a communication program to proceed to communication accessing to a web page of an advertiser who has presented the corresponding advertising data.

To accomplish the second object of the present invention, there is provided an advertisement servicing method using an e-mail arrival notifying program comprising the steps of a) creating animation characters with advertising data presented by a plurality of advertisers by a server computer and constructing an e-mail arrival notifying program having animation characters as a database; b) storing member registration data input by a plurality of users connected for communication through a communication network, downloading the e-mail arrival notifying program having the animation characters to a corresponding user computer according to the user's request and installing the program on the computer; c) executing the e-mail arrival notifying program upon receipt of the corresponding user's e-mail to a particular e-mail server designated by the user and displaying the animation character with predetermined advertising data; d) generating e-mail read data according to the user's e-mail viewing to output the same to the server computer and executing a communication program upon completion of the user's e-mail viewing to proceed to communication accessing to a web page of an advertiser who has presented the corresponding advertising data; and e) analyzing the advertisement viewed by the users based on the e-mail read data generated by the user's e-mail viewing, and accumulating predetermined points on each user's account.

BRIEF DESCRIPTION OF THE DRAWINGS

The above object and advantages of the present invention will become more apparent by describing in detail a preferred embodiment thereof with reference to the attached drawings in which:

FIGS. 5 through 8 are flow charts showing in detail the operations of the respective sub-routines shown in FIG. 4.

DESCRIPTION OF THE PREFERRED EMBODIMENTS

An advertisement servicing system using an e-mail arrival notifying program according to embodiments of the present invention will now be described in detail with reference to the accompanying drawings.

Figure 1:
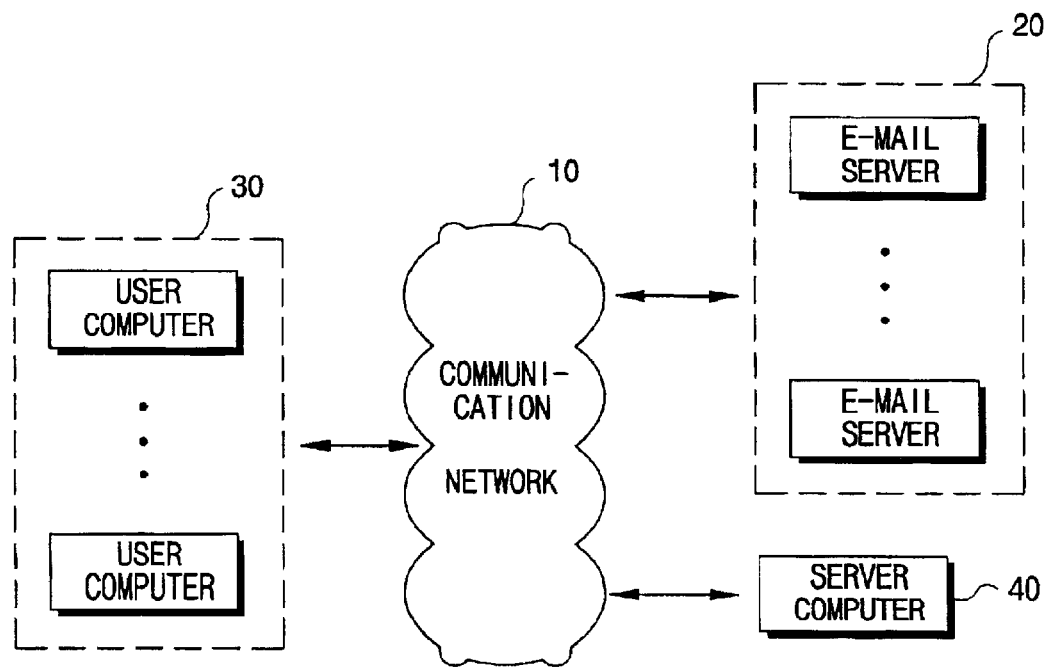
FIG. 1 is a schematic block diagram of an advertisement servicing system using an e-mail arrival notifying program according to an embodiment of the present invention.

FIG. 1 is an advertisement servicing system using an e-mail arrival notifying program according to an embodiment of the present invention.

As show in FIG. 1, a communication network 10, for example, wired/wireless Internet, connects communication circuits among a plurality of e-mail servers 20, a plurality of user computers 30 and a server computer 40 to allow data communication relating to e-mail transmission/reception and e-mail arrival notification.

The plurality of e-mail servers 20 provide a plurality of users who have registered as members with accounts and predetermined repository spaces, and renders services of transmitting/receiving e-mail messages to/from the plurality of users.

The plurality of user computers 30 perform communication accessing with the server computer 40 through the communication network 10 and then download and install an e-mail arrival notifying program having an animation character with predetermined advertising data. When the e-mail of the corresponding user is received by one e-mail server designated by the user among the plurality of e-mail servers 20, the plurality of user computers 30 automatically execute the e-mail arrival notifying program to then display the animation character with the advertising data on a screen for user's e-mail viewing.

The plurality of user computers 30 create e-mail read data and output the same to the server computer 40 when the corresponding user views the e-mail addressed to himself/herself by the animation character with the advertising data displayed on the screen. When the e-mail viewing is completed, the plurality of user computers 30 automatically execute the communication program incorporated in the computer to proceed to communication accessing to a particular web page of an advertiser who has presented the corresponding advertising data.

The server computer 40 creates a plurality of animation characters with the advertising data offered by a plurality of advertisers and an e-mail arrival notifying program having the animation characters to then construct a database thereof, respectively. Also, upon request by the plurality of user computers 30 connected for communication, the server computer 40 downloads the e-mail arrival notifying program to the corresponding user computer 30. Then, the server computer 40 receives the e-mail read data created when the user reads the e-mail message using the e-mail arrival notifying program from the plurality of user computers 30, analyzes the advertising data viewed by the users, and then accumulates predetermined points on each user's account.

Here, the server computer 40 provides the corresponding user computer 30 with the e-mail arrival notifying program having an animation character with particular advertising data when a plurality of users select their preferred advertising data, for example, advertisement copy, logo, commercial music (CM) and the like, and their preferred animation characters, being not intended as a restriction, and may provide the corresponding user computer 30 with animation characters with another advertising data periodically, for example, every day or every week, independent of user's selection.

Also, the server computer 40 may perform advertisement targeted to the corresponding field according to the user profile, for example, territory, occupation, age and so on, using the e-mail arrival notifying program.

Further, once the above-described e-mail arrival notifying program, which is a program stationed on a random access memory (RAM), is set to network connection when it is downloaded from the server computer 40 and installed on the computer, it can remain connected to the network while the power of the computer is on, even through the program is not executed by separate key manipulation.

Also, according to the e-mail arrival notifying program, the service of automatically generating data concerning the corresponding user's e-mail read status and read time to then send an e-mail message relating to the data back to the e-mail sender, may be performed when the user reads the e-mail message addressed to himself/herself. In other words, unlike the conventional e-mail read status notification service in which the service program is installed on the e-mail server, the e-mail arrival notifying program according to the present invention program is installed on the user computer 30.

The server computer 40 can further increase the utilization efficiency of the corresponding program, including schedule management, for the benefit of a plurality of users using the e-mail arrival notifying program, and can provide a function of automatically entering schedules of user's interested fields, for example, movie release schedules, concert schedules and so on, thereby attaining additional advertising effects.

Figure 2:
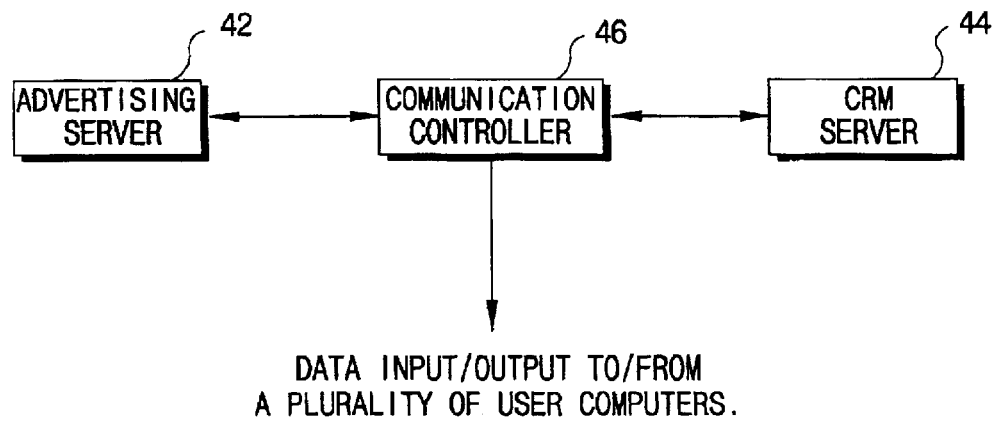
FIG. 2 is a detailed block diagram of a server computer shown in FIG. 1.

FIG. 2 is a detailed block diagram of the server computer 40 shown in FIG. 1.

As shown in FIG. 2, an advertising server 42 creates animation characters with text, logo and commercial music presented by a plurality of advertisers and stores the same on a database. Also, the advertising server 42 produces an e-mail arrival notifying program having the animation characters and stores the same on a database. Further, upon receipt of an e-mail arrival notifying program download request signal from the plurality of user computers 30, the advertising server 42 outputs the e-mail arrival notifying program stored on the database to the corresponding user computer.

A customer relationship management (CRM) server 44 stores on a database member registration data input by a user who intends to use the e-mail arrival notifying program having animation characters. Whenever the e-mail read data, generated when viewing the e-mail received from a particular e-mail server 20 using the e-mail arrival notifying program downloaded from the advertising server 42, is input through the communication network 10, the CRM server 44 accumulates predetermined points on the corresponding user's account in reward for the user's advertisement viewing, analyzes the user's read advertising data and then stores the analysis result data in a database.

The CRM server 44 offers cash or merchandise to a user as a prize when the corresponding user's accumulated points exceed a predetermined reference level, and offers analysis result data for users' viewed advertising data to advertisers according to the advertisers' request.

A communication controller 46 receives the e-mail arrival notifying program download request signal from the plurality of user computers 30 connected for communication through the communication network 10 to then output the same to the advertising server 42, outputs the e-mail arrival notifying program input from the advertising server 42 to the corresponding user computer 30, receives the e-mail read data, generated when e-mail messages are viewed, from the plurality of user computers 30, to then output the same to the advertising server 42, and outputs the point data accumulated for each user in reward for the user's advertisement viewing to the corresponding user computer 30 in accordance with the user's request.

Figure 3:
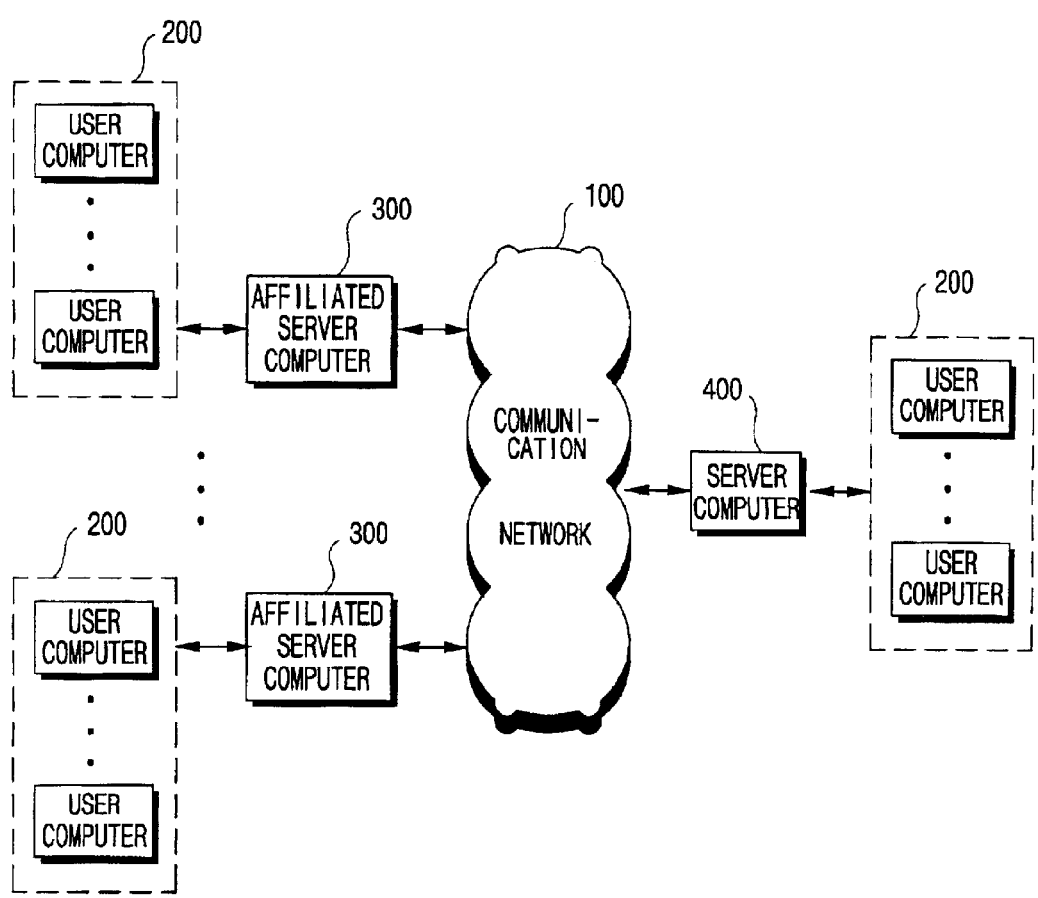
FIG. 3 is a schematic block diagram of an advertisement servicing system using an e-mail arrival notifying program according to another embodiment of the present invention.
Figure 4:
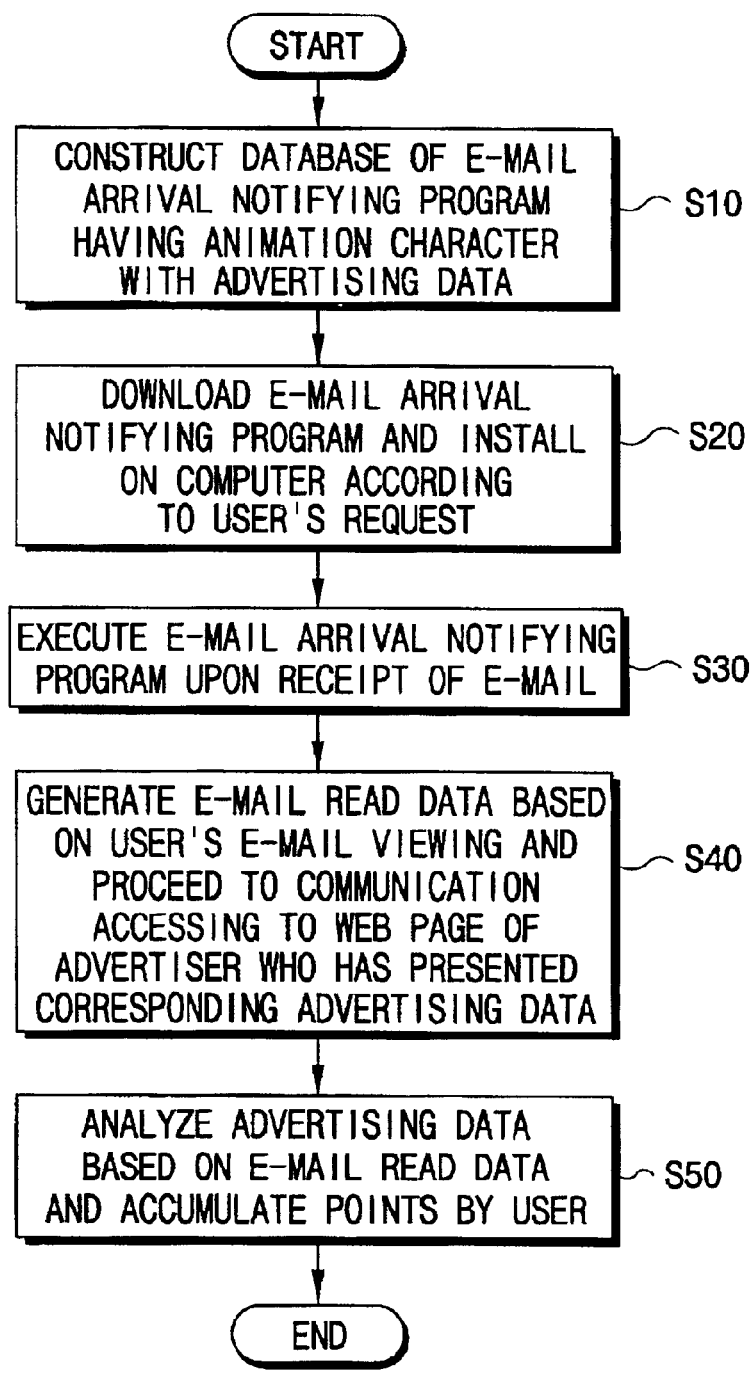
FIG. 4 is a flow chart showing in detail the operation of an advertisement servicing method using an e-mail arrival notifying program according to the present invention.

FIG. 3 is a schematic block diagram of an advertisement servicing system using an e-mail arrival notifying program according to another embodiment of the present invention.

As shown in FIG. 3, a communication network 100 connects communication circuits among a plurality of user computers 200, a plurality of affiliated server computers 300 and a server computer 400 to allow data communication relating to e-mail transmission/reception, e-mail arrival notification, and advertising analysis.

The plurality of user computers 200 perform communication accessing with the server computer 400 or affiliated server computers 300 that provide e-mail service through the communication network 100, which will later be described, to perform member registration, and then downloads and installs an e-mail arrival notifying program having an animation character with predetermined advertising data. Also, when the e-mail of the corresponding user is received from the affiliated server computers 300 or the server computer 400 that have performed member registration, the user computers 200 automatically execute the e-mail arrival notifying program to then display the animation character with the advertising data on a screen.

Also, when the corresponding user views the e-mail addressed to himself/herself, the corresponding user computer 200 generates e-mail read data and outputs the same to the affiliated server computers 300 or server computer 400. Then, when the e-mail viewing is completed, the user computer 200 automatically executes the communications program to proceed to communication accessing to a particular web page of the advertiser who has presented the corresponding advertising data.

The plurality of affiliated server computers 300 create a plurality of animation characters with advertising data presented by a plurality of advertisers to then construct a database thereof, and simultaneously downloads the e-mail arrival notifying program having the animation characters from the server computer 400 to be described later to then construct a database thereof. Also, the plurality of affiliated server computers 300 endow a plurality of users registered as members with their own accounts and predetermined repository spaces, and simultaneously downloads to the corresponding user computer 200 the e-mail arrival notifying program offered from the server computer 400 established in an affiliated relationship.

Also, the plurality of affiliated server computers 300 render services of allowing a plurality of users to transmit/receive e-mail messages to/from one another, analyze advertisement based on the e-mail read data generated when the users view the e-mail messages using the e-mail arrival notifying program, and then output the analysis result data to the server computer 400.

Here, the plurality of affiliated server computers 300 may receive from the server computer 400 the combined advertisement analysis result data by users who use the respective affiliated server computers 300, thereby independently executing advertisement planning and implementation suited for the corresponding site.

The server computer 400 creates a plurality of animation characters with advertising data presented by a plurality of advertisers to then construct a database thereof, and simultaneously creates an e-mail arrival notifying program having the animation characters to then construct a database thereof. Also, the server computer 400 provides the plurality of affiliated server computers 300 with the e-mail arrival notifying program having animation characters and downloads to the corresponding user computer 200 the e-mail arrival notifying program according to the request of the plurality of user computers 200 connected for communication through the communication network 100.

Also, the server computer 400 receives from the plurality of user computers 200 the e-mail read data generated when the users read e-mail messages using the e-mail arrival notifying program, analyzes the advertisement viewed by the users, accumulates predetermined points on each user's account, receives advertisement analysis result data performed independently by the respective affiliated server computers 300, to then generate combined analysis result data for the users' viewed advertisement based on the result of advertisement analysis performed by the server computer 400 itself and the result of advertisement analysis performed independently by the respective affiliated server computers 300, and then provides the generated analysis result data to the plurality of advertisers and the affiliated server computers 300.

In other words, unlike the prior art in which an advertising system is independently constructed by a site that provides advertising services, advertising data is presented from a plurality of advertisers and then advertisement is performed, according to the present invention, the e-mail arrival notifying program and advertising analysis system, targeted for existing members, are implemented by the server computer 400, without separately constructing a new system, thereby providing advertising services suitable for members' characteristics, simultaneously offering the advertising services to many users in a short time and effectively attaining analysis data based on members' advertisement viewing.

Next, the advertisement servicing method using the e-mail arrival notifying program according to an embodiment of the present invention will be described in detail by referring to the system shown in FIG. 1

FIGS. 4 through 8 are flow charts showing in detail the operations of the advertisement servicing method using the e-mail arrival notifying program according to the present invention.

First, animation characters with advertising data presented by a plurality of advertisers are created by the server computer (40 of FIG. 1) and an e-mail arrival notifying program having animation characters are constructed as a database to start an e-mail arrival notification service (step S10).

Then, the server computer 40 stores member registration data input by a plurality of users connected for communication through the communication network (10 of FIG. 1), downloads the e-mail arrival notifying program having animation characters to the corresponding user computer (30 of FIG. 1) according to the user's request and then installs the program on the computer (step S20), which will now be described in detail.

Figure 5:
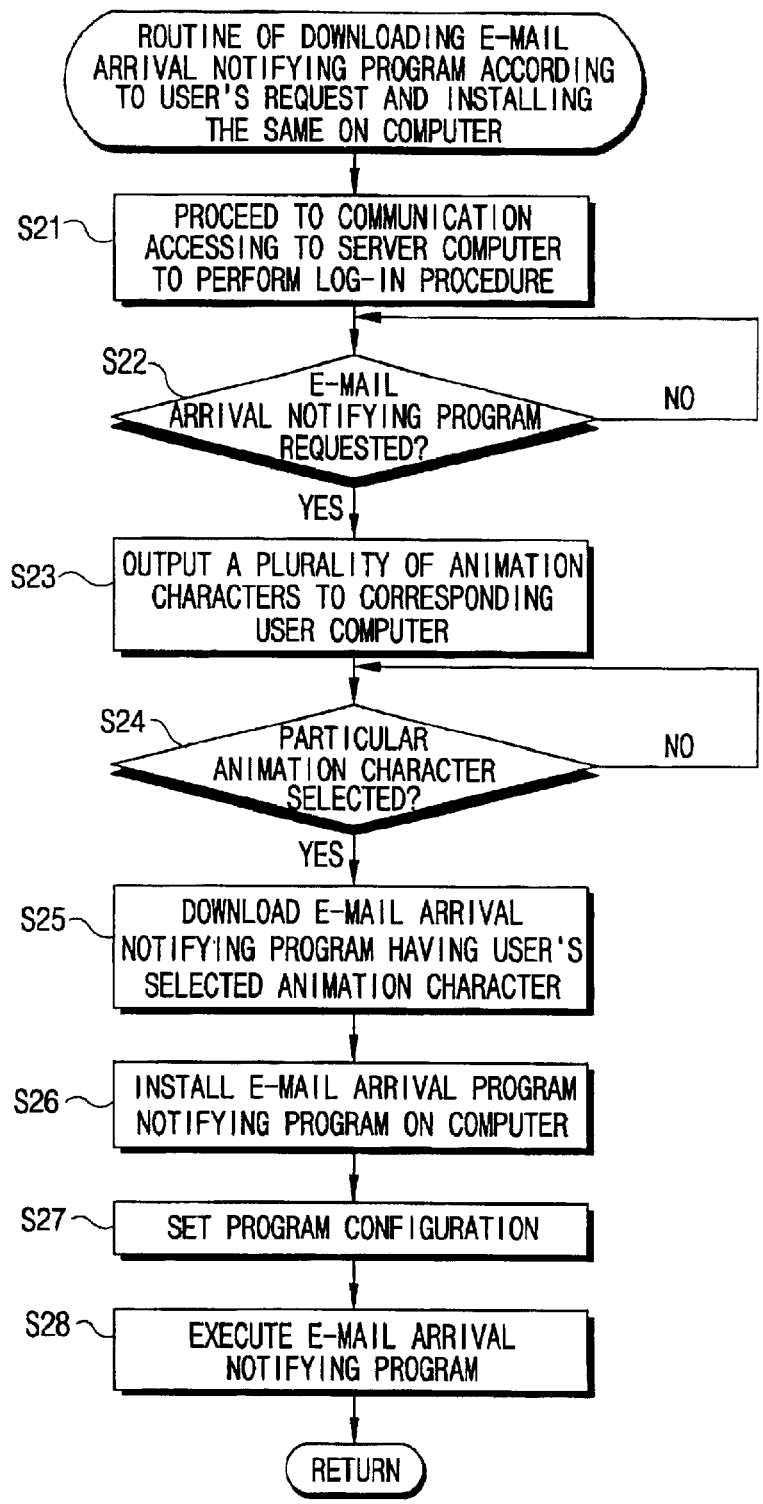

Referring to FIG. 5, the plurality of users who intend to use the e-mail arrival notifying program perform communication accessing to the server computer 40 through the communication network 10 to perform a log-in procedure (step S21). Here, in the case of newly registered users, the user enters data necessary for member registration according to a predetermined format available from the server computer 40. Then, the server computer 40 stores the member registration data input by the user in a database.

After the user who has connected for communication performs the log-in procedure, it is determined whether or not the e-mail arrival notifying program having animation characters is requested by the corresponding user (step S22). If the e-mail arrival notifying program having animation characters is requested, the server computer 40 outputs the plurality of animation characters constructed in the form of a database to the corresponding user computer (step S23). In other words, the animation characters constructed in the form of a database are provided to the users so as to select one or more animation characters among the plurality of animation characters offered by the server computer 40.

Thereafter, it is determined by the server computer 40 whether or not the corresponding user's desired animation character is selected by the user (step S24). If the user's desired animation character is selected, the e-mail arrival notifying program having the corresponding animation character is downloaded to the user computer 30 (step S25). Then, the user installs the e-mail arrival notifying program having the corresponding animation character downloaded from the server computer 40, on the computer (step S26).

Next, the e-mail arrival notifying program is executed to set program configurations for notifying e-mail arrival, such as selection of a particular e-mail server, selection of a desired animation character or user profile input (step S27). Then, the e-mail arrival notifying program is executed according to the program configurations set by the corresponding user (step S28).

Now, upon the corresponding user's e-mail arrival at the particular e-mail server 20 designated by the user after the user installs the e-mail arrival notifying program having animation characters with advertising data, the program provided from the server computer 40, through the above-described routine S20, the e-mail arrival notifying program is executed to then display the animation character with predetermined advertising data inserted on the screen (step S30), which will now be described in detail.

Figure 6:
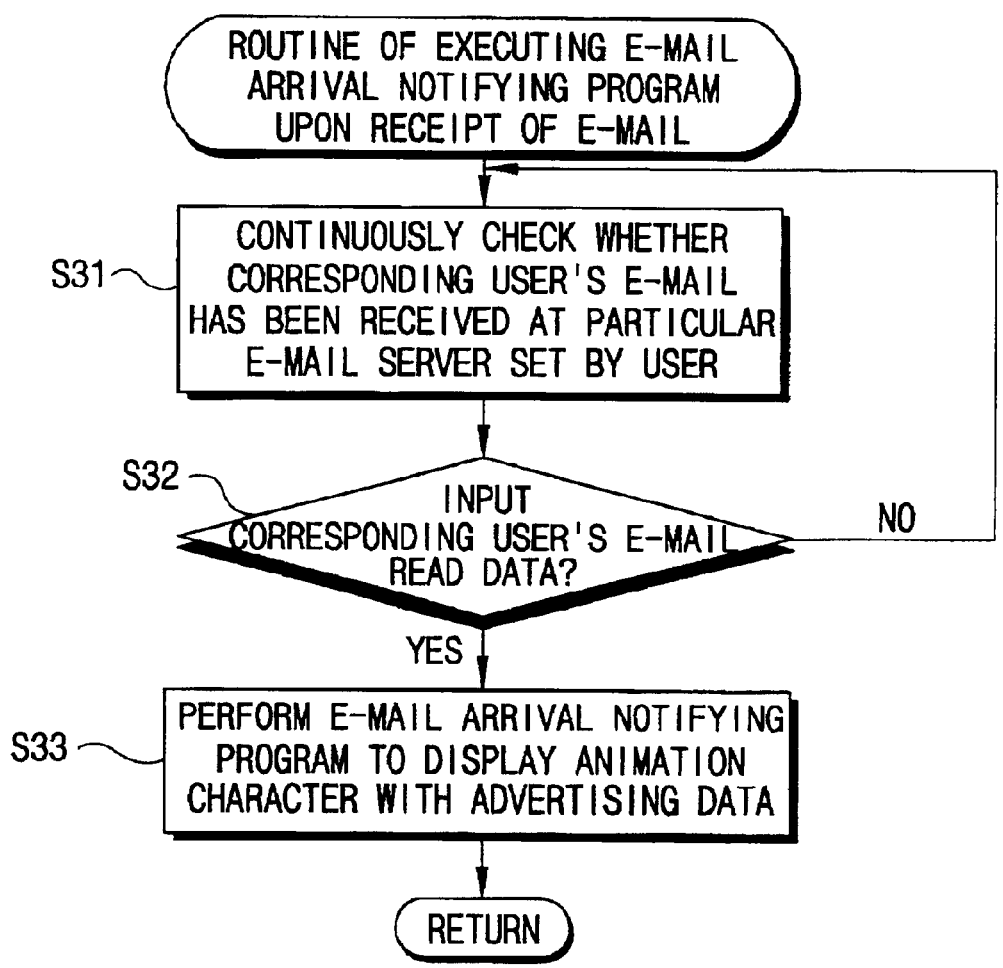

Referring to FIG. 6, it is continuously checked by the e-mail arrival notifying program installed on the computer 30 whether or not an e-mail message of the corresponding user has arrived at the particular e-mail server 20 designated by the user (step S31).

It is determined whether or not the confirmation data that notifies that the corresponding user's e-mail has arrived, is input from the particular e-mail server 20 (step S32). If the confirmation data is input, the e-mail arrival notifying program is executed to display the animation character with predetermined advertising data on the screen to notify the user of the e-mail arrival (step S33).

Here, the animation character displayed on the screen includes particular advertising text or logo, sometimes with commercial music.

After performing the procedure of notifying that an e-mail has arrived through the above-described routine S30, according to the e-mail arrival notifying program, e-mail read data is generated by the corresponding user's e-mail viewing and then output the generated data to the server computer 40, and the communication program is executed upon completion of the user's e-mail viewing to then perform communication accessing to the web page of the advertiser who has presented the corresponding advertising data (step S40), which will now be described in detail.

Figure 7:
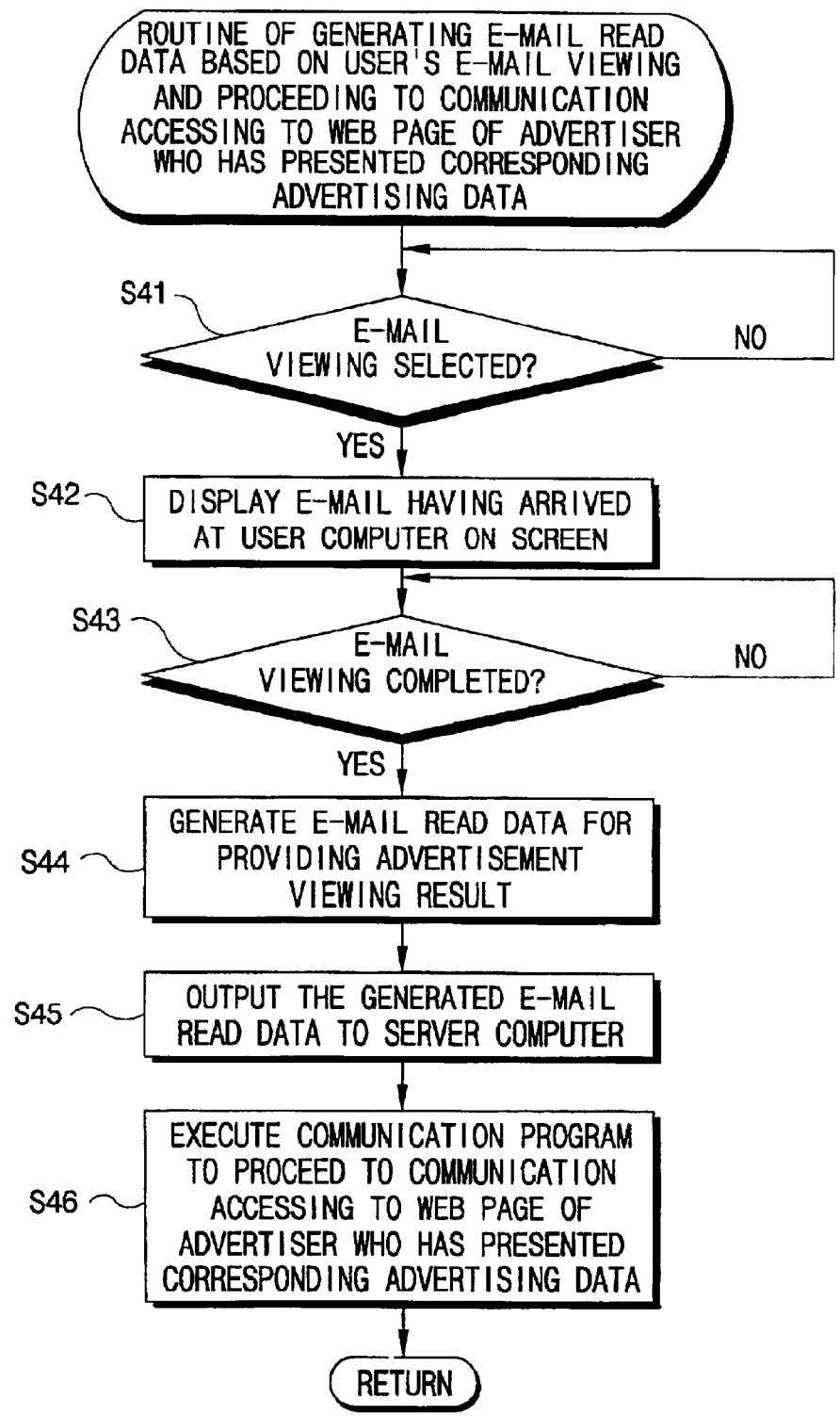

Referring to FIG. 7, it is determined whether or not the user who has viewed the animation character with advertising data displayed on the screen selects e-mail viewing (step S41). If yes, the e-mail addressed to the corresponding user is displayed on the screen so that the user can read the e-mail message (step S42).

Then, it is determined whether or not the user's e-mail viewing is completed (step S43). If yes, e-mail read data for notifying the server computer 40 that the corresponding user has viewed the predetermined advertising data displayed with the animation character, is generated (step S44).

Thereafter, the e-mail read data generated by the e-mail viewing is output to the server computer 40 (step S45), and then the communication program installed on the computer 30 is executed to perform communication accessing to the web page of the advertiser who has presented the corresponding advertising data (step S46).

After performing the communication accessing to the web page of the advertiser through the step S46 as described above, the user can purchase a particular advertised commodity or others by electronic commerce and can obtain more detailed product information.

If the e-mail read data generated when the user views the e-mail is output from the particular user computer 30 through the above-described routine S40, the server computer 40 analyzes the number of advertisements exposed to the users, types of advertisements and so on, based on the e-mail read data generated by the user's e-mail viewing, and accumulates predetermined points on each user's account in reward of user's advertisement viewing (step S50), which will now be described in detail.

Referring to FIG. 8, it is determined by the server computer 40 whether the e-mail read data of notifying that predetermined advertising data is viewed by the corresponding user when the user receives an e-mail message, is input from the plurality of user computers 30 (step S51).

As the result, if it is determined that the e-mail read data is input, the server computer 40 analyzes the number of advertisements exposed to users, types of advertisements and the like, by a plurality of pieces of advertising data, based on the e-mail read data input from the plurality of user computers 30, and stores the analysis result in a database (step S52). Then, the server computer 40 accumulates predetermined points on each user's account in reward for the user's viewing of advertising data (step S53).

Thereafter, the server computer 40 determines whether the accumulated points exceed a predetermined reference level (step S54). If the points accumulated by user exceed the predetermined reference level, cash or merchandise is offered to the corresponding user (step S55).

After analyzing the number of advertisements exposed to users through the step S52, if the analysis result data for advertisement is requested by a plurality of advertisers that have presented the advertising data, the server computer 40 extracts analysis result data for the users' advertisement viewing, stored in the database, and offers the analysis result data to the corresponding advertiser.

Then, if confirmation of points accumulated in reward for user's advertisement viewing through the step S53 is requested by the corresponding user, the server computer 40 provides the corresponding user computer 30 with the points accumulated up to now.

As described above, according to the advertisement servicing system using the e-mail arrival notifying program of the present invention, the arrival of an e-mail message addressed to a user is followed up on a real-time basis using the e-mail arrival notifying program, the animation character with predetermined advertising data is immediately executed and displayed on a screen, and then the corresponding user is automatically notified of e-mail arrival. Thus, since it is not necessary for the user to periodically connect to a particular e-mail server, the e-mail service through the Internet can be conveniently utilized.

Also, since the server computer measures/analyzes the number of advertisements exposed to the users who have installed the e-mail arrival notifying program, and accumulates points for the users' advertisement viewing, the user can be advantageously rewarded by cash or merchandise from the server computer according to the achievement of advertisement viewing using e-mail reception.

Further, since predetermined advertising data is offered to the corresponding user whenever an e-mail arrives and the users are exposed to advertisements more frequently than general Internet advertising, a plurality of advertisers can also benefit by advertising effects. Also, since advertising data is displayed only when an e-mail arrives and the advertising data is not provided while the users read their e-mail messages, the users can favorably view the advertisement without a repulsive feeling like a spam for junk mails, which further promotes the advertising effects.

While the present invention has been particularly shown and described with reference to preferred embodiments thereof, it will be understood by those skilled in the art that various changes in form and details may be made therein without departing from the spirit and scope of the invention.

What is claimed is:

1. An advertisement servicing system using an electronic mail (e-mail) arrival notifying program comprising:

a communication network for connecting a plurality of communication circuits to allow data communication;

a plurality of e-mail servers for providing a plurality of users who have registered as members with accounts and predetermined repository spaces, and rendering services of transmitting/receiving e-mail messages to/from the plurality of users;

a server computer for creating a plurality of animation characters with advertising data presented by a plurality of advertisers to then construct a database thereof and simultaneously creating an e-mail arrival notifying program having the animation characters to then construct a database thereof, receiving e-mail read data, analyzing the advertising data viewed by the users, and accumulating predetermined points on each user's account; and a plurality of user computers for downloading and installing the e-mail arrival notifying program from the server computer through the communication network, automatically executing the e-mail arrival notifying program to then display the animation character on a screen for user's e-mail viewing when the e-mail of the corresponding user is received by an e-mail server designated by the user among the plurality of e-mail servers, creating the e-mail read data and outputting the same to the server computer when the corresponding user views the e-mail addressed to himself/herself by the animation character, and when the user's e-mail viewing is completed, automatically executing a communication program to proceed to communication accessing to a web page of an advertiser who has presented the corresponding advertising data.

2. The advertisement servicing system according to claim 1, wherein the server computer comprises:

an advertising server for creating animation characters with text, logo and commercial music presented by the plurality of advertisers and storing the same on a database, producing the e-mail arrival notifying program having the animation characters and storing the same on a database, outputting the e-mail arrival notifying program stored on the database to the corresponding user computer upon receipt of an e-mail arrival notifying program download request signal from the plurality of user computers;

a customer relationship management (CRM) server for storing on a database member registration data input by a user who intends to use the e-mail arrival notifying program, whenever the e-mail read data is input through the communication network, accumulating predetermined points on the corresponding user's account in reward for the user's advertisement viewing, analyzing the users' viewed advertisement and storing the analysis result data in a database, offering cash or merchandise to the user as a prize when the corresponding user's accumulated points exceed a predetermined reference level, and offering analysis result data for users' viewed advertisement to the advertisers according to the advertisers' request; and a communication controller for receiving the e-mail arrival notifying program download request signal from the plurality of user computers to then output the same to the advertising server, outputting the e-mail arrival notifying program input from the advertising server to the corresponding user computer, receiving the e-mail read data from the plurality of user computers, to then output the same to the advertising server, and outputting the point data accumulated for each user to the user computer in accordance with the user's request.

3. The advertisement servicing system according to claim 1, wherein the server computer provides the corresponding user computer with animation characters with periodically different pieces of advertising data, independent of user's selection of desired particular advertising data and animation character.

4. The advertisement servicing system according to claim 1, wherein the e-mail arrival notifying program is a program stationed on a random access memory (RAM).

5. The advertisement servicing system according to claim 1, wherein when the user views the e-mail addressed to himself/herself, the e-mail arrival notifying program automatically generates data relating to the corresponding user's e-mail read status and read time and sends an e-mail to a corresponding e-mail sender.

6. An advertisement servicing system using an electronic mail (e-mail) arrival notifying program comprising:
a communication network for connecting a plurality of communication circuits to allow data communication;
a plurality of affiliated server computers for creating a plurality of animation characters with advertising data presented by a plurality of advertisers to then construct a database thereof, endowing a plurality of users registered as members with their own accounts and predetermined repository spaces, rendering services of allowing a plurality of users to transmit/receive e-mail messages to/from one another, analyzing advertisement based on e-mail read data generated when the corresponding user views the e-mail addressed to himself/herself using an e-mail arrival notifying program and outputting the analysis result data;
a server computer for creating a plurality of animation characters with advertising data presented by a plurality of advertisers to then construct a database thereof and simultaneously creating the e-mail arrival notifying program having the animation characters to then construct a database thereof, providing the e-mail arrival notifying program to the plurality of affiliated server computers so as to be constructed as a database thereof and then to be downloaded to a corresponding user computer, analyzing the advertisement viewed by users depending on e-mail read data from the corresponding user computer, accumulating predetermined points on each user's account, generating combined analysis result data for the users' viewed advertisement based on the result of advertisement analysis performed by the server computer itself and the analysis result data from the respective affiliated server computers, and providing the combined analysis result data to the plurality of advertisers and the affiliated server computers; and
a plurality of user computers for downloading and installing the e-mail arrival notifying program from the server computer or the plurality of affiliated server computers through the communication network, to perform member registration, automatically executing the e-mail arrival notifying program to then display the animation character with the advertising data on a screen for user's e-mail viewing when the e-mail of the corresponding user is received from the server computer or the plurality of affiliated server computers, creating the e-mail read data and outputting the same to the server computer or the plurality of affiliated server computers when the corresponding user views the e-mail addressed to himself/herself by the animation character, and automatically executing a communication program to proceed to communication accessing to a web page of an advertiser who has presented the corresponding advertising data, when the user's e-mail viewing is completed.

7. The advertisement servicing system according to claim 6, wherein the plurality of affiliated server computers receive from the server computer the combined advertisement analysis result data by users who use the respective affiliated server computers and independently executes advertisement planning and implementation suited for the corresponding site.

8. An advertisement servicing method using an e-mail arrival notifying program comprising the steps of:
a) creating animation characters with advertising data presented by a plurality of advertisers by a server computer and constructing an e-mail arrival notifying program having animation characters as a database;
b) storing member registration data input by a plurality of users connected for communication through a communication network, downloading the e-mail arrival notifying program having the animation characters to a corresponding user computer according to the user's request and installing the program on the computer;
c) executing the e-mail arrival notifying program upon receipt of the corresponding user's e-mail to a particular e-mail server designated by the user and displaying the animation character with predetermined advertising data;
d) generating e-mail read data according to the user's e-mail viewing to output the same to the server computer and executing a communication program upon completion of the user's e-mail viewing to proceed to communication accessing to a web page of an advertiser who has presented the corresponding advertising data; and
e) analyzing the advertisement viewed by the users based on the e-mail read data generated by the user's e-mail viewing, and accumulating predetermined points on each user's account.

9. The advertisement servicing method according to claim 8, wherein the step b) comprises the sub-steps of:
b1) performing communication accessing to the server computer through the communication network to perform a log-in procedure of a plurality of users;
b2) determining whether the e-mail arrival notifying program having animation characters is requested by the corresponding user;
b3) outputting the plurality of animation characters constructed in the form of a database to the corresponding user computer;
b4) determining whether the corresponding user's desired animation character is selected by the user;
b5) downloading the e-mail arrival notifying program having the corresponding animation character to the user computer;
b6) installing on the computer the e-mail arrival notifying program having the corresponding animation character downloaded from the server computer;

b7) setting program configurations for notifying e-mail arrival, including selection of a particular e-mail server, selection of a desired animation character and user profile input; and b8) executing the e-mail arrival notifying program according to the program configurations set by the corresponding user.

10. The advertisement servicing method according to claim 8, wherein the step c) comprises the sub-steps of:

c1) continuously checking whether an e-mail message of the corresponding user has arrived at the particular e-mail server designated by the user in the e-mail arrival notifying program installed on the computer;

c2) determining whether the confirmation data that notifies that the corresponding user's e-mail has arrived, is input from the particular e-mail server; and c3) if the confirmation data is input, executing the e-mail arrival notifying program to display the animation character with predetermined advertising data on the screen to notify the user of the e-mail arrival.

11. The advertisement servicing method according to claim 8, wherein the step d) comprises the sub-steps of:

d1) determining whether the user who has viewed the animation character with advertising data displayed on the screen selects e-mail viewing;

d2) if the user selects e-mail viewing, displaying the e-mail addressed to the corresponding user on the screen;

d3) determining whether the user's e-mail viewing is completed;

d4) if the user's e-mail viewing is completed, generating e-mail read data for providing the advertising data viewing result;

d5) outputting the generated e-mail read data to the server computer; and d6) executing the communication program installed on the computer to perform communication accessing to the web page of the advertiser who has presented the corresponding advertising data.

12. The advertisement servicing method according to claim 8, wherein the step e) comprises the sub-steps of:

e1) determining whether the e-mail read data is input from the plurality of user computers;

e2) analyzing the number of advertisements exposed to users and the types of advertisements, by a plurality of pieces of advertising data, based on the e-mail read data input from the plurality of user computers, and storing the analysis result in a database;

e3) accumulating predetermined points on each user's account in reward for the user's viewing of advertising data;

e4) determining whether the points accumulated by user exceed a predetermined reference level; and e5) if the points accumulated by user exceed the predetermined reference level, offering cash or merchandise to the corresponding user.

13. The advertisement servicing method according to claim 12, wherein after analyzing the number of advertisements exposed to users through the step e2), if the analysis result data for advertisement is requested by a plurality of advertisers that have presented the advertising data, extracting analysis result data for the users' advertisement viewing, stored in the database, and offering the analysis result data to the corresponding advertiser.

* * * * *